UNITED STATES PATENT OFFICE.

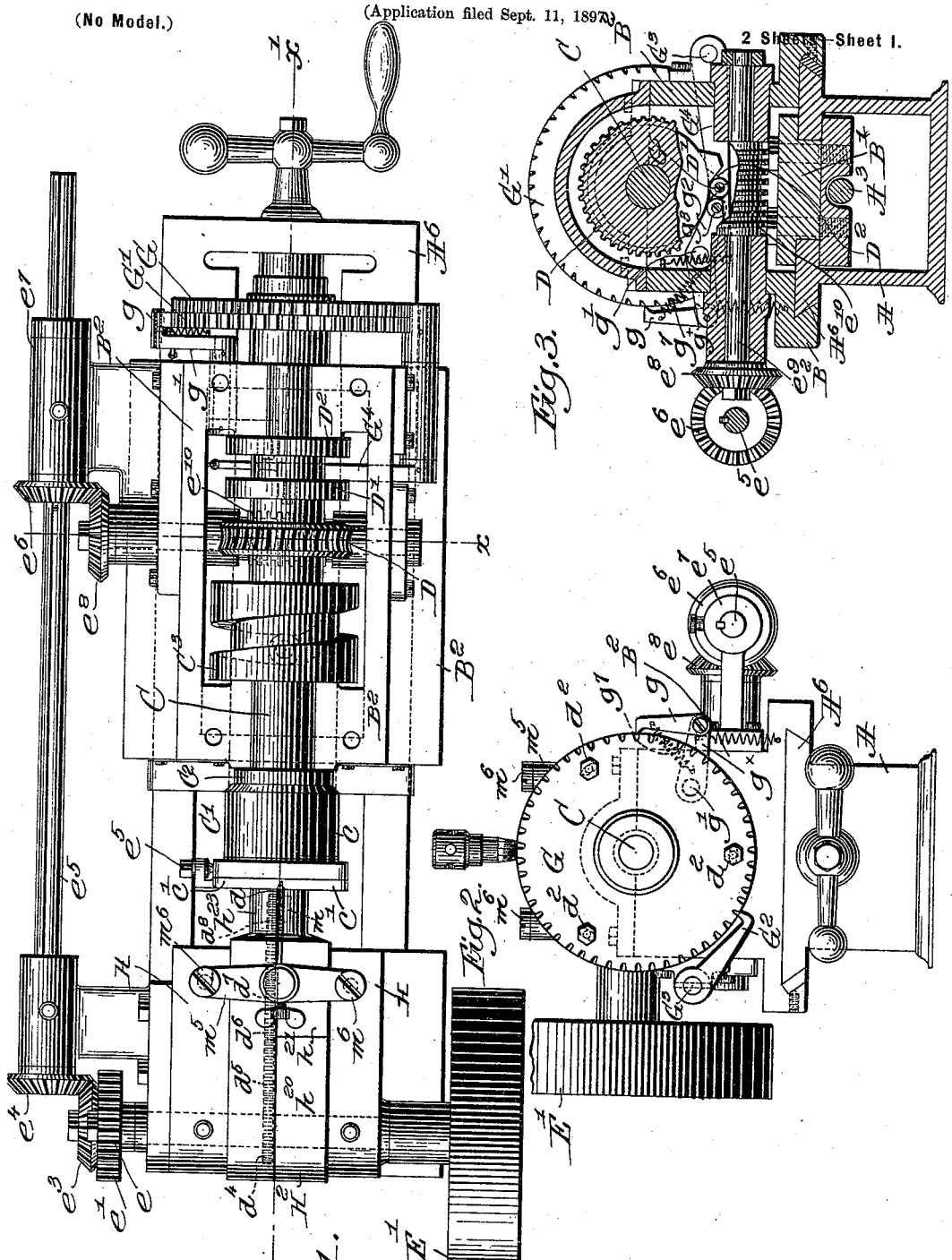

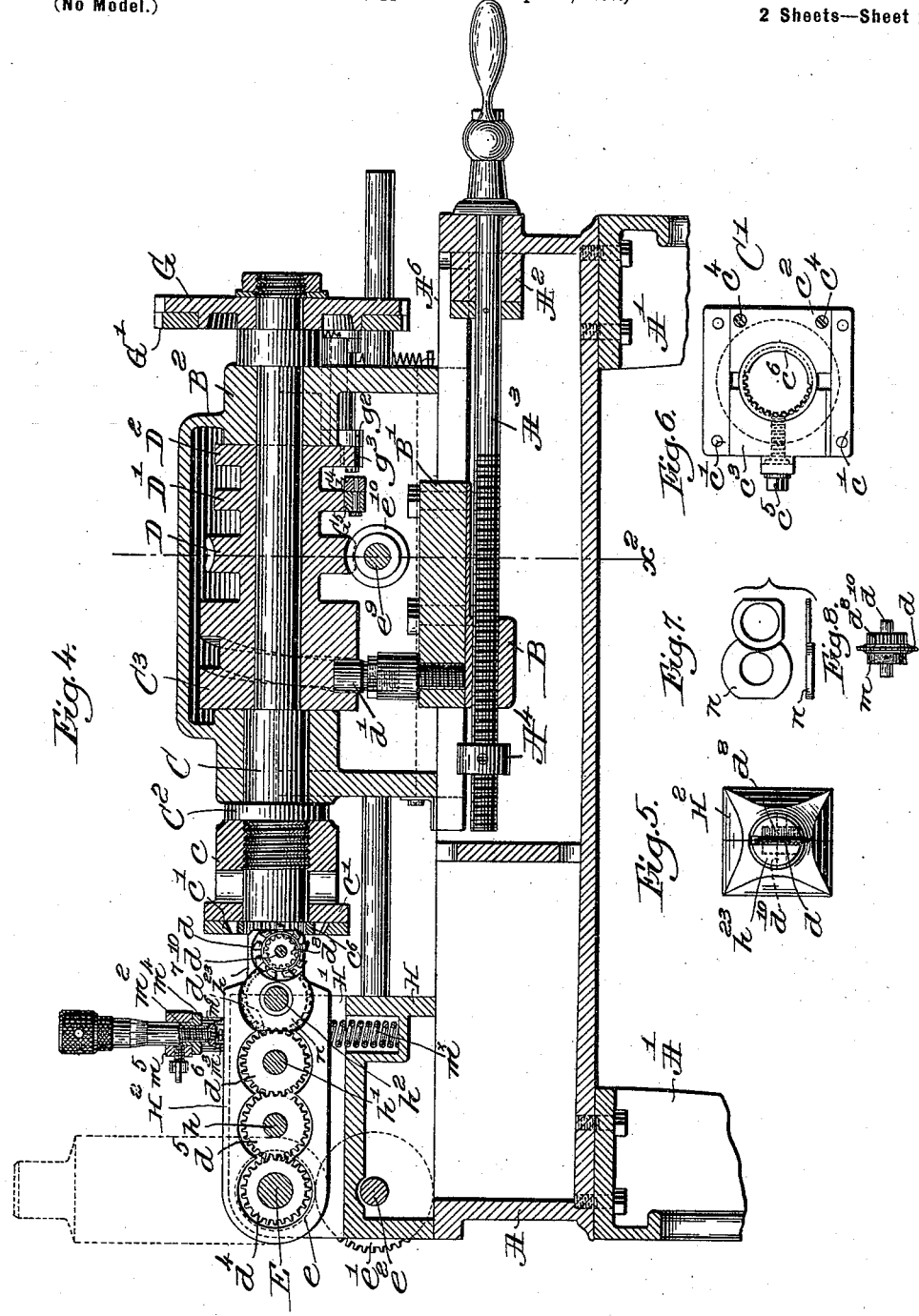

MARIETTA REECE AND FRANCIS A. SHEA, OF BROOKLINE, MASSACHUSETTS, ADMINISTRATORS OF JOHN REECE, DECEASED.

MACHINE FOR CUTTING GEAR-TEETH.

SPECIFICATION forming part of Letters Patent No. 607,629, dated July 19, 1898.

Application filed September 11, 1897. Serial No. 651,281. (No model.)

*To all whom it may concern:*

Be it known that JOHN REECE, deceased, late of Brookline, Massachusetts, invented an Improvement in Machines for Cutting Gear-Teeth, of which the following description, in connection with the accompanying drawings, is a specification, like letters on the drawings representing like parts.

This invention has for its object the production of a novel machine by which to cut the teeth of gears.

The invention to be herein described has been illustrated as adapted to cut internal teeth on a blank held in a suitable chuck. The teeth are cut by means of a rotating milling tool or wheel mounted on a shaft carried in a head, the said head being vertically movable with relation to the axis of rotation of the shaft carrying the chuck in order to enable the milling-tool to cut the teeth in to the proper depth. This head contains a train of gearing actuated by a gear on the main shaft, said shaft constituting the pivot for the head.

Figure 1 is a top or plan view of a machine embodying this invention. Fig. 2 is a left-hand end view thereof. Fig. 3 is a section in the line $x$, Fig. 1. Fig. 4 is a longitudinal section in the line $x'$, Fig. 1. Fig. 5 is an end view of the head in which is mounted the shaft carrying the milling-cutter. Fig. 6 shows a blank or annulus partially cut and properly held in the chuck at the end of the rotatable shaft. Fig. 7 shows the chip-shield detached. Fig. 8 shows the milling-cutter and its shaft detached.

The framework consists, essentially, of a suitable bed A, mounted on suitable legs A'. The bed A has a suitable bearing $A^2$ for a hand-operated screw-shaft $A^3$, said screw-shaft having fixed upon it, adjustably, however, as to its position, a stop-collar $A^4$. The thread of this screw-shaft enters a threaded nut B, connected with or forming part of the bed B' of a carriage $B^2$, mounted to slide on suitable guideways $A^6$ at the upper edge of the bed, said carriage having usual flanged edges (see Fig. 3) to embrace the dovetailed edges of the guideway at the top of the bed. By rotating this screw-shaft by hand the carriage and bed-plate may be moved forward and then backward to thereby adjust the milling-tool, to be described, into proper position to commence work, and the teeth of the blank or annulus having been properly milled or cut to the desired depth then the screw-shaft may be again turned to bring the carriage back into its inoperative position.

The carriage $B^2$ has mounted in it a suitable spindle or shaft C, provided at its inner end with a chuck C', (see Fig. 6,) said chuck being screwed onto the end of said shaft C up to a collar $C^2$, fast on or made solid with relation to the said shaft. The chuck is composed of a hollow sleeve $c$ and a face-plate $c'$, the said face-plate being grooved to provide undercut ways for the reception of jaws $c^2$ and $c^3$, each of said jaws being suitably concaved at their operating edges. The jaw $c^2$ is fixed in the ways by means of suitable set-screws $c^4$; but the jaw $c^3$ is movable in said ways in order that it may be adjusted to correctly hold the blank or annulus $c^6$ to be cut internally in the production of an internal toothed gear. The jaw $c^3$ is made adjustable as to its position by or through an adjustable screw $c^5$, passed loosely through a hole in an ear connected with said jaw and entering a screw-thread cut in the face-plate. The concavities in the faces of these jaws may vary according to the diameter of the blank or annulus to be held and provided with teeth.

To properly cut the teeth, either the milling-cutter $d$ or the carriage and the shaft having the chuck holding the blank or annulus must be moved one relatively toward and from the other. In this instance the chuck is made movable relatively to the milling-cutter, and this must be done automatically after the chuck has been put into its proper relative working position to start the cutting of the teeth.

The spindle or shaft C next the chuck has loosely mounted on it a sleeve provided with a cam $C^3$ and next back of it a worm toothed gear D, and then the said sleeve has fixed upon it two extra cams D' and $D^2$, the length of the sleeve being substantially such as to just enter and fit the top opening in the carriage, so that said sleeve may rotate freely on or with relation to the shaft C, and yet in its rotation be slid longitudinally by reason of the roller or other stud $d'$ in the groove of said cam carrying with it the carriage, the latter sliding on the bed.

The driving-shaft E of the machine has a suitable belt-pulley E', adapted to be actuated by a belt from any usual or suitable counter-shaft. This shaft E has at its opposite end a toothed gear $e$, (shown in full lines, Fig. 1, and by dotted lines, Fig. 4,) which engages a larger toothed gear $e'$, mounted on a stud $e^2$, said gear having fast to it a bevel toothed gear $e^3$, which engages a second beveled toothed gear $e^4$, fast on a shaft $e^5$, having splined upon it loosely a bevel-gear $e^6$, the hub of which is contained in a sleeve $e^7$, fixed with relation to the carriage B$^2$, said bevel-gear $e^6$ engaging a bevel-gear $e^8$ on a shaft $e^9$, provided with a suitable worm $e^{10}$, which engages the worm toothed gear D of the said sleeve and rotates the said sleeve continuously, the latter in its rotation causing the cam-groove in the cam C$^3$ of the sleeve to travel on the roller or other stud $d'$, extended, as herein shown, above the carriage-bed B', which is held stationary while a tooth is being cut, and as a result thereof the sleeve is moved longitudinally, taking with it the carriage B$^2$. In this way the automatic longitudinal movement of the carriage and the shaft is insured for a distance equal to the length of the gear-tooth to be cut.

The outer end of the shaft C has fixed upon it a locking-gear G, having a series of teeth, and at the inner side of this locking-gear there is attached in an adjustable manner a spacing-ring G', it also having a series of teeth, and the grooves separating these teeth may be adjusted relatively one to the other by means of set-screws $d^2$, extended loosely through slots in the locking-gear and entering screw-threaded openings in the spacing-ring. The locking-gear is engaged and held positively by a suitable locking-pawl G$^2$, mounted on a rock-shaft G$^3$, having an arm G$^4$, which is provided with a roller or other stud G$^5$, which is acted upon by a projection of the cam D', secured to said sleeve, the said cam operating to move the locking-dog to release the locking-gear after a tooth has been cut and preparatory to imparting a partial rotation to the shaft C to bring a new portion of the blank or annulus in position to be cut for the formation of another tooth.

The teeth to be cut in a gear vary in their size and distance apart, and the spacing-ring provides for this. The spaces in the spacing-ring are engaged by a spacing-pawl $g$, which also serves the purpose of a feeding-pawl, it being mounted on an arm $g^\times$ of a rock-shaft $g'$, mounted in the carriage, said rock-shaft having a second arm $g^2$, provided with a roller or stud $g^3$, which is acted upon by the cam D$^2$, carried by said sleeve, the said cam, whenever it operates, causing the said spacing and and feeding pawl, which is under the control of a spiral spring $g^7$, to normally keep it pressed against the periphery of the spacing-ring to be moved and turn the said spacing-ring, and with it the shaft, for the desired distance, and immediately thereafter the locking-ring is again locked and the shaft C again restrained from rotation until after that tooth has been cut and finished. It will thus be seen that by the adjustment of the spacing-ring on the locking-ring any desired variation within suitable limits may be made in the spacing of the teeth of the internal gear.

The bed A has fixed upon it a suitable head-block H, recessed at its upper side, as at H', for the reception of a head H$^2$, the said head being shaped to fit and surround loosely the shaft E. This head is composed of two pieces, divided longitudinally through its center, each of said pieces at its inner end having an opening to fit the shaft E, and said opening is further enlarged to embrace a gear $d^4$, keyed onto the shaft E. One-half of this head has suitable chambers (see Fig. 4) for the reception of the intermediate gears $d^5$, $d^6$, $d^7$, and the gear $d^8$ on the shaft $d^{10}$ of the milling-tool $d$. Some of these chambers are bored to receive the studs $h$ $h'$ $h^2$, on which turn the gears $d^5$ $d^6$ $d^7$.

The gear $d^8$ is fast on or forms part of the stud $d^{10}$, and said stud has fixed upon it a suitable collar $m$, (see Fig. 8,) and between said collar and gear is fastened the milling-tool $d$, said milling-tool being changeable as desired, according to the tooth to be cut. To readily gain access to this milling-tool, the one-half or the said head may be further subdivided into two pieces $h^{20}$ and $h^{21}$, the piece $h^{21}$ being detachable when desired.

The head H$^2$ is normally elevated by a spring $m^\times$, and the head may be adjusted in opposition to said spring by an adjusting-screw $m^2$, having a foot $m^3$ resting on the upper side of said head. The screw $m^2$ enters a threaded nut $m^4$ in a yoke $m^5$, sustained at its ends on suitable posts $m^6$ $m^6$, rising from the block H. By the rotation of the screw $m^2$ the depth of cut made by the teeth of the milling-cutter may be exactly regulated.

The teeth of the milling-cutter are made to project through the nose $h^{23}$ of the head, and the annulus to be provided with teeth at its interior having been properly chucked and the carriage moved forward to bring the inner edge of the annulus substantially in contact with the tooth of the milling-cutter, the machine is started, the spindle being restrained from rotation by means of the locking-pawl, and the milling-tool commences to cut, and the shaft C, having the chuck, is moved forward until the milling-tool cuts a groove to form the space for the first tooth, and a tooth having been cut the spindle or shaft C is immediately started backward owing to the shape of the cam in the cam-hub C$^3$, and the milling-tool is made to travel again through the groove that it has just cut, and the milling-tool having been taken entirely away from the annulus to be cut the locking-pawl is disengaged and the spacing and feeding pawl is immediately thrown into operation to impart a partial rotation to the shaft C for putting an uncut portion of the annulus in position to be again attacked by the milling-cutter and cut for another tooth. This operation is continued until the annulus has been completely toothed at its interior.

To keep the chips produced by the milling-tool from getting into the teeth of the actuating-train, the head has been provided with a chip-plate n, (shown in Fig. 7,) it being placed in position to cover one side of the intermediate gear which engages the gear fixed with relation to the milling-tool before the milling-tool is put into its operative position.

This invention is not limited to the exact form of clutch herein shown, nor to the exact form of gearing illustrated by which to rotate the milling-cutter.

What is claimed, and desired to be secured by Letters Patent, is—

1. In a machine for cutting internal gear-teeth, the following instrumentalities, viz: a rotatable spindle having suitable chucks to hold the blank to be provided with teeth; a pivoted head having its end shaped to enter the opening in said blank, a rotatable milling-cutter mounted in said head, means to adjust said head vertically, a suitable actuating-train to rotate said milling-cutter, means to change the relative position of said spindle and head to enable said milling-cutter to cut a space across said blank, substantially as described.

2. In a machine for cutting gear-teeth on a blank, a spindle having suitable chucks for holding the blank to be toothed, a carriage on which said spindle is mounted, a head provided with a milling-cutter movable in a vertical plane intersecting the axis of said shaft, means to rotate said milling-cutter to cut a space in said blank for the formation of a tooth, and means to change the position of said shaft and said milling-cutter to cut a tooth-slot of the proper length, substantially as described.

3. In a machine for cutting internal gear-teeth, the following instrumentalities, viz: a rotatable spindle having suitable chucks to hold the blank to be provided with teeth; a head having its end shaped to enter the opening in said blank, a milling-cutter supported at the end of said head, a suitable actuating-train to rotate said milling-cutter, a locking device for holding said blank-carrying spindle against rotation while a tooth is being cut, a spacing device, and mechanism for automatically operating it, to rotate said spindle step by step, and means to regulate the extent of said rotation for producing teeth of any width desired, substantially as described.

4. In a machine for cutting internal gear-teeth, the following instrumentalities, viz: a rotatable spindle having suitable chucks to hold the blank to be provided with teeth; a head having its end shaped to enter the opening in said blank, a milling-cutter supported at the end of said head, a suitable actuating-train to rotate said milling-cutter, a locking-ring and cam mounted on said spindle, means engaged by said cam for intermittingly rotating the locking-ring, and a spacing-ring and mechanism, in connection with said locking-ring, for governing the extent of movement of the spindle, substantially as described.

5. In a machine for cutting gear-teeth, a milling-cutter, a shaft having means to hold the blank to be cut, a carriage on which said shaft is mounted, a sleeve surrounding said shaft loosely and provided with a grooved cam, and with two extra cams, an adjustable stud entering the groove of said cam, means to rotate said sleeve on said shaft, a locking-gear fixed on said shaft, a locking device to engage said locking-gear to restrain said shaft from rotation, a spacing gear or ring at one side of said locking-gear and adjustable with relation thereto, a spacing and feeding pawl, and means intermediate said locking-pawl and one of said extra cams to unlock said locking-pawl, and means between said spacing and feeding pawl to immediately thereafter actuate said spacing or feeding pawl and cause it in engagement with the said spacing gear or ring to impart a partial rotation to said shaft to put a new part of said blank in position to be attacked by said milling-cutter, substantially as described.

6. The pivoted head, a spring normally turning said head on its pivot, an adjusting device to set the head in opposition to said spring, the main shaft having an attached gear, and a milling-cutter arranged at one end of said head and having its teeth properly exposed, combined with a train of gears in said head intermediate said milling-cutter and the gear on said main shaft to rotate said milling-cutter, substantially as described.

7. The pivoted head, the main shaft having an attached gear, and a milling-cutter arranged at one end of said head and having its teeth properly exposed, combined with a train of gears in said head intermediate said milling-cutter and the gear on said main shaft to rotate said milling-cutter, and a chip-guard to prevent the chips made by the action of the milling-cutter from getting between the teeth of the train of gears in the head, substantially as described.

In testimony whereof we have signed our names to this specification in the presence of two subscribing witnesses.

MARIETTA REECE,
FRANCIS A. SHEA,
*Administrators of John Reece, deceased.*

Witnesses:
GEORGE C. HILL,
FRANK L. CADY.